Nov. 5, 1968  J. A. HITT  3,408,888
SHEARING APPARATUS
Filed Sept. 17, 1965
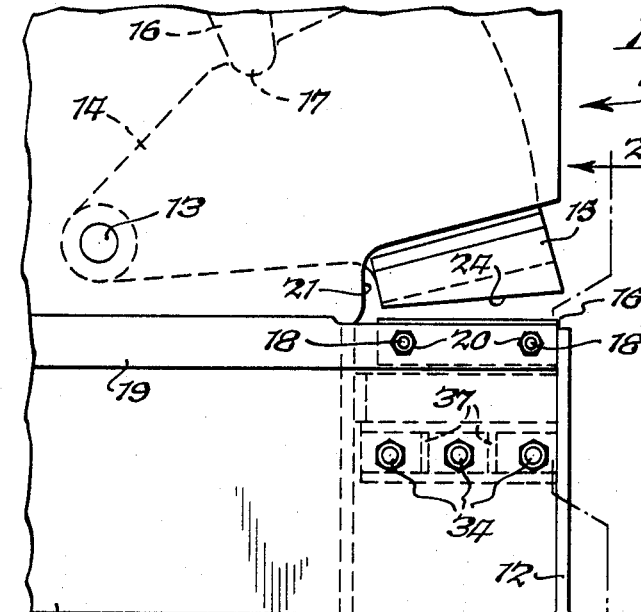
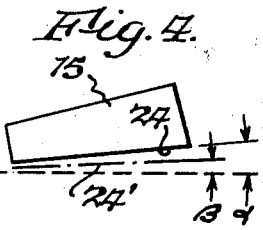
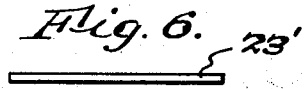
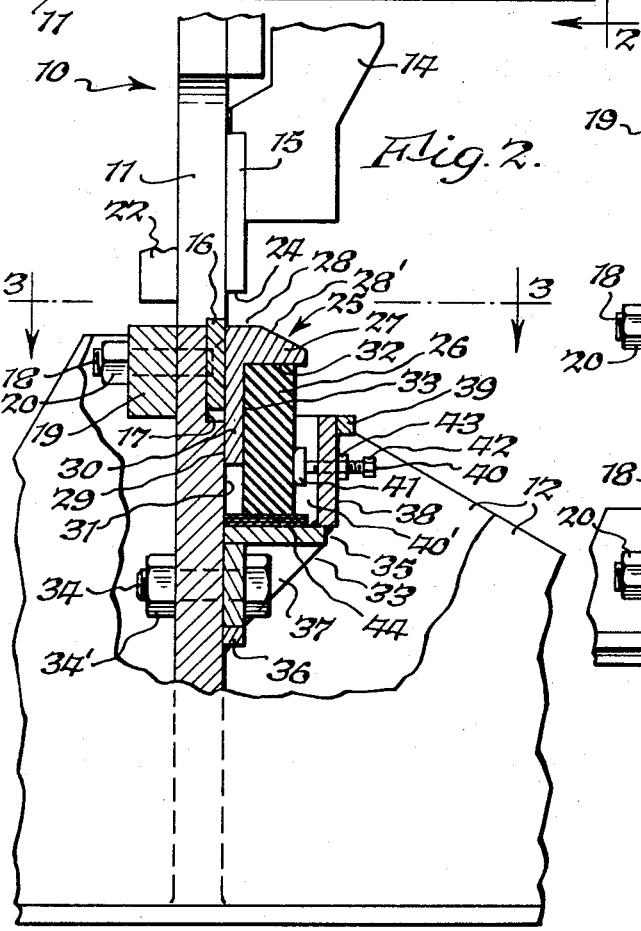
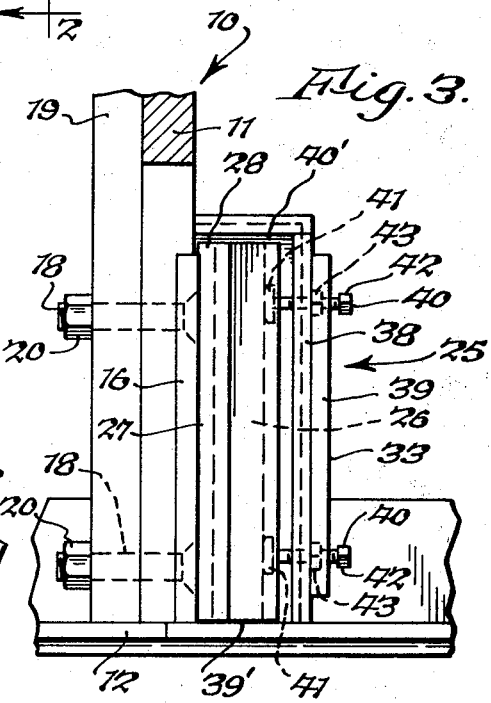
INVENTOR.
James A. Hitt
BY
Joseph P. Gastel
ATTORNEY.

United States Patent Office 3,408,888
Patented Nov. 5, 1968

3,408,888
SHEARING APPARATUS
James A. Hitt, Lakeview, N.Y., assignor to Buffalo Forge Company, Buffalo, N.Y., a corporation of New York
Filed Sept. 17, 1965, Ser. No. 488,122
6 Claims. (Cl. 83—142)

ABSTRACT OF THE DISCLOSURE

A shearing machine for shearing a workpiece from a member with relatively low power and without attendant curling including a frame, a pair of knives mounted on said frame with one of the knives being relatively movable toward and away from the other and having a rake angle which would normally cause curling of the workpiece but which permits relatively low power to be utilized in effecting the shearing, and a resilient block underlying the movable knife, and having a metal cap and being located in a housing mounted on said frame, said housing including spaced abutments engaging the side of the block which permits it to yield as required during the shearing action but which holds the block with sufficient force to provide sufficient resistance to prevent the curling.

---

The present invention relates to an improved shearing machine and an improved workpiece support therefor for shearing a workpiece from a metal member.

There are metal shearing machines of various types in existence. Generally these machines consist of first and second relatively movable knives between which a member to be sheared is placed. Normally a machine of the foregoing type includes a first knife which is rigidly fixed to the frame of the machine and a second knife which is movable toward and away from the first knife. The amount of power required to effect the shearing is dependent on the rake angle of the movable knife. More specifically, the greater the rake angle the less the power requirements, and the less the rake angle the greater the power requirements. In other words, the power requirements vary inversely with the rake angle. However, as the rake angle increases, the workpiece tends to curl and assume a curved shape. In other words, with the above types of shearing machines a straight workpiece cannot be obtained with a knife having a high rake angle. This, in the past, necessitated subsequent forming operations to straighten the curled workpiece. Another way of obviating the curling was to use a knife having a relatively low rake angle, and while this causes the workpiece to be relatively straight, the power requirements of the shearing machine are greatly increased. Thus, according to prior shearing practice there were two alternatives. The first was to effect the shearing with a relatively high rake angle knife and thereafter straighten the curled workpiece with a subsequent metal working operation; or a relatively low rake angle knife could be utilized in a machine having high power requirements. In either event, the shearing was costly because of either the multiplicity of work operations or the high power requirements, which, in turn, required machines which contained relatively high horsepower motors and relatively massive frames. It is with the overcoming of the foregoing shortcomings of metal shearing machines that the present invention is concerned.

It is accordingly one object of the present invention to provide an improved shearing machine which will produce a relatively straight workpiece with relatively low power requirements and without any requirement for subsequent metal working operations for straightening the workpiece.

A further object of the present invention is to provide an improved work support for a metal shearing machine which enables said machine to operate with a high rake angle knife at low power requirements without producing attendant curling of a workpiece. Other objects and attendant advantages of the present invention will readily be perceived hereafter.

The improved shearing machine of the present invention which shears a workpiece from a member with relatively low power and without attendant curling of the workpiece comprises a frame, a first knife mounted on the frame, a second knife relatively movable with respect to said first knife and having a rake angle which would normally cause curling of said workpiece but which permits relatively low power to be utilized in effecting said shearing, and resilient workpiece support means underlying said second knife for supporting said workpiece with sufficient force as it is sheared to cause said workpiece to be maintained in a substantially straight condition, without appreciably increasing the power requirements for effecting said shearing.

In accordance with a preferred embodiment of the present invention the improved workpiece support means comprises a block of urethane rubber which serves as a workpiece support cushion and which has a metal cap for protecting the cushion from abrasion, both of the foregoing being carried in an housing adapted to be mounted on the frame of a shearing machine.

The improved method of the present invention for shearing a workpiece from a member with relatively low power requirements and without attendant curling of the workpiece comprises the step of providing first and second relatively movable knives, with the first knife having a relatively high rake angle which will normally permit relatively low power requirements during shearing but which will normally produce attendant curing of the workpiece, and the additional step of supporting the workpiece in opposition to said first knife with a force sufficient to cause the workpiece to remain relatively straight without appreciably increasing the power requirements for effecting the shearing of said workpiece from said member.

The improved shearing machine of the present invention will be more fully understood when the following portions of the specification are read in conjunction with the accompanying drawings wherein:

FIGURE 1 is a fragmentary side elevational view of a shearing machine having relatively movable knives mounted therein;

FIGURE 2 is a view, partially in cross section, taken substantially along line 2—2 of FIGURE 1 and showing the resilient workpiece support in relationship to the relatively movable knives;

FIGURE 3 is a view taken substantially along line 3—3 of FIGURE 2;

FIGURE 4 is a schematic view showing the difference between a high and a low rake angle on a movable knife;

FIGURE 5 is a side elevational view showing a curled workpiece normally obtained with a high rake angle knife;

FIGURE 6 is a side elevational view of a relatively straight workpiece obtained with a relatively high rake angle knife when supported by the resilient workpiece support of the present invention; and FIGURE 7 is an end elevational view of a workpiece showing particularly the sheared edge of said workpiece.

The improved shearing machine 10 of the present invention is shown in FIGURES 1, 2 and 3. The shearing machine includes a central frame member 11, which is essentially a vertical plate which stands on a pair of legs 12 which are essentially also vertical plates oriented perpendicularly to plate 11. Pivotally mounted on pin 13 supported by plate 11 is a bar cutter plate 14 which is essentially pie-shaped and which mounts movable knife 15 at the lower end thereof. A bar cutter ram 16 is received within notch 17 of the bar cutter plate 14, and this ram is selectively actuated through a suitable linkage driven by a motor (not shown) to cause movable knife 15 to move downwardly toward stationary knife 16. Thereafter plate 14 returns to the position shown in FIGURE 1 under the urging of a suitable spring (not shown). Suitable screws (not shown) removably fasten movable knife 15 to plate 14.

The stationary knife 16 is mounted within recess 17 in plate 11. A pair of bolts 18, having their heads (not numbered) countersunk within the side of blade 16, extend through aligned apertures in knife 16, plate 11 and reinforcing bar 19 and have nuts 20 mounted thereon, which in combination with bolts 18 lock knife 16 securely in position. As can be seen from FIGURES 1 and 2, plate 11 is cut away at 21 to permit a member-to-be-sheared to be inserted between movable knife 15 and stationary knife 16. A work hold-down 22 operates in the conventional manner to prevent the left end of the member from pivoting in a clockwise direction about stationary knife 16 in FIGURE 2 as movable knife 15 moves downwardly and engages it during the shearing operation.

The workpiece 23 (FIG. 5) is an elongated substantially rectangular strip slightly shorter than the blades 15 and 16, and it has a pronounced curl if a high rake angle movable knife 15 is used. In this respect it is to be noted from FIGURE 4 that a high rake angle knife 15 is one having the rake angle such as alpha. The rake angle is essentially the angle between the horizontal and the lower edge 24 of the knife in the position the knife assumes as it first engages the workpiece. A low rake angle knife would be one having a rake angle such as beta, that is the angle between the horizontal and a knife edge 24'. It can thus be seen that the angle alpha is greater than the angle beta. Furthermore, it can be seen that when knife 15 having a high rake angle edge 24 shears a workpiece from a member, the knife edge acts progressively on the workpiece. Therefore only sufficient power is required to cause a portion of the knife to cut through a portion of the member at a particular instant. However, if a knife having a low rake edge 24' is used, substantially the entire knife edge would engage the workpiece at the same time. Thus the power requirements for the shear would be greater with a movable knife having a low rake angle beta as compared to one having a high rake angle alpha. However, as noted above, a workpiece 23 which is sheared by a knife having a rake angle alpha would normally have a pronounced curl which would require a subsequent straightening operation.

In order to obviate the curling of workpiece 23 as shown in FIGURE 5 and to cause it to assume the side elevational profile of the workpiece 23' shown in FIGURE 6 an improved work support 25 is provided. This work support consists of a substantially rectangular block-like work support cushion of urethane rubber 26 having a substantially inverted L-shaped work support cap 27 mounted thereon. Top 28 of cap 27 is engaged by the underside of the workpiece being sheared and the surface 29 of leg 30 abuts the side 31 of plate 11 and is thus guided as cap 27 yields during a shearing operation. Sloping surface 28' is adjacent top 28. The slope or bevel permits relatively easy access to top 28. Surfaces 32 and 33 of cap 27 securely engage the adjacent surfaces (not numbered) of urethane rubber support cushion 26. Cap 27 provides a tough surface overlying cushion 26 to prevent the latter from being worn incidental to repeated shearing action.

The work support 25 consisting of the work support cushion 26 and the work support cap 27 are carried in a housing 33 mounted on plate 11 by bolts 34 which extend through aligned apertures in plates 11 and 36 and are secured in position by nuts 34'. More specifically, the housing 33 includes an upper horizontal plate 35 extending substantially perpendicularly to a lower vertical plate 36 and welded thereto. A plurality of gussets 37 welded between plates 35 and 36 firmly support horizontal plate 35 against bending or yielding downwardly during a shearing operation. Extending substantially perpendicularly in a vertical direction from horizontal plane 35 is a side plate 38 which is stiffened at its upper edge by stiffener rod 39 which prevents plate 38 from bowing outwardly under stress. Plates 35 and 38 essentially define a trough having an open end at 39' and a plate 40' at the opposite end serving as an abutment for cushion 26. This permits cushion 26 and cap 27 to be slid into position. A plurality of tightening screws 40 are threaded through tapped apertures (not numbered) in plate 38 and have circular discs 41 mounted at the ends thereof for engaging the side of work support cushion 26 to maintain the outer side of leg 30 in abutting engagement with the side of knife 16 to prevent foreign matter from entering therebetween. Lock nuts 43 which are mounted on the shanks of screws 40 are utilized to lock the screws 40 in any desired adjusted position wherein discs 41 are in abutting engagement with cushion 26. Shims 44 are inserted between cushion 26 and plate 35 to adjust the top of cap 27 to the desired height. In this respect, it is preferred that the top of knife 16 be slightly higher than the top 28 of cap 27 to thereby cause the workpiece to be engaged by top 28 slightly after the shearing. However, the relative heights may be adjusted to meet any particular exigency which may be governed by such factors as the thickness of the workpiece, its hardness and the rake angle of the knife.

The power requirement for the shear is maintained relatively low because of the use of a relatively high rake angle knife. However, as the workpiece is sheared from the member it is engaged by cap 27 which is supported by cushion 26. The firm yielding action provided by cushion 26 causes the resultant workpiece to be straight in the direction of its length. It will also be appreciated that the support provided by workpiece support 25 causes the sheared edge of the workpiece to be relatively square because the tendency for clockwise rotation of the workpiece in FIGURE 2 about the upper right edge of fixed knife 16 is minimized. In this respect, by adjusting the relative heights of cap top 28 and the top of blade 16, the squareness of the sheared edge 23" may be controlled.

The urethane rubber which has been utilized successfully is known by the trademark Adiprene L-100 and is a commercial product of the E. I. du Pont de Nemours & Co. The specific urethane rubber utilized has a Shore hardness of 90 A, a tensile strength of 4,500 p.s.i. and a maximum deflection of 30%. The specific urethane rubber noted above is a liquid castable polymer made from a 4-carbon polyether glycol resin and organic diisocyanates. The urethane rubber may also be described as a reaction product of organic polyisocyanates and low molecular weight resins containing two or more hydroxyl groups per molecule.

Test results have indicated the following: Firstly, without using a workpiece support, the stress on the frame of a shearing machine is between 60 and 70 percent less when a high rake angle knife is used than when a low rake angle knife is used. When a workpiece support such as disclosed here is used with a high rake knife, the stress on the frame of the shear did not increase more than 10 percent above the stress experienced on the machine when such knife was used by itself. The stress on the machine is a measure of the power required to effect shearing. Thus test results have shown that a straight workpiece can be obtained with a high rake angle knife and workpiece support with an increase in power requirements of less than 10 percent over that which would be experienced when such a knife was used by itself, under which circumstances it would have given a curled workpiece. However, it is especially significant that even with such a slight increase in power requirements with a high rake knife, the fact remains that straight workpieces are obtained by the use of such a knife and workpiece support at greatly reduced power requirements compared to the use of a low rake knife. In other words, a straight workpiece is obtained with lower power requirements than heretofore obtainable.

In the preceding description, the terms low rake knife and high rake knife were used. A high rake knife is one which is considered to have an angle of approximately five degrees and a low rake knife is one having an angle of approximately one degree. Furthermore, in the preceding description, the term "power" was used. As used, it means the force required to shear a workpiece and usually this force is measured in pounds or tons. The conventional way of measuring this force is by measuring the stress on the frame of the shear, as noted above.

In lieu of the construction shown in the drawings, a construction having pins extending downwardly from cap 27 through cushion 26 and into bushings in plate 35 can be used to maintain alignment of cap 27 on cushion 26.

It will also be appreciated that while the drawings have depicted the use of a movable knife which is pivotable about a given point, the principles of the present invention may also be used in the type of a shear wherein the movable knife reciprocates in a rectilinear path toward and away from the stationary knife.

While preferred embodiments of the present invention have been disclosed, it will readily be appreciated that it is not limited thereto but may be otherwise embodied within the scope of the following claims.

I claim:

1. A shearing machine for shearing a workpiece from a member with relatively low power and without attendant curling of said workpiece comprising a frame, a first stationary knife mounted on said frame, a second knife, means mounting said second knife for movement toward and away from said first knife, said second knife having a relatively high rake angle which would normally cause curling of said workpiece but which permits relatively low power to be utilized in effecting said shearing, and workpiece support means mounted on said frame adjacent said first knife and located in opposition to said second knife, said workpiece support means comprising a housing secured to said frame, an urethane rubber workpiece cushion mounted on said housing, a work support cap having a first portion overlying said urethane rubber cushion to engage said workpiece and therefore preventing said workpiece from abrading said cushion, said cap having a second portion which guides the direction of movement of said cap to thereby cause said first portion to be guided in a predetermined path during the shearing of said workpiece, and wherein said second portion is located at the side of said cushion and adjustment screws for engaging said cushion on an opposite side thereof from said second portion of said cap, said adjustment screws engaging only a portion of said cushion to thereby permit the remainder thereof to expand during the distortion experienced during said shearing operation.

2. A shearing machine for shearing a workpiece from a member with relatively low power and without attendant curling of said workpiece comprising a frame, a first stationary knife mounted on said frame, a second knife, means mounting said second knife for movement toward and away from said first knife, said second knife having a relatively high rake angle which would normally cause curling of said workpiece but which permits relatively low power to be utilized in effecting said shearing, and workpiece support means adjacent said first knife and located in opposition to said second knife, said workpiece support means comprising a resilient block-like workpiece cushion having a top and opposed first and second side portions, housing means for mounting said cushion on said frame, said housing means including a bottom for supporting said cushion, a work support cap having a portion overlying said top of said cushion to engage said workpiece and therefore prevent said workpiece from abrading said cushion, and means operatively associated with said housing for engaging only part of said first side portion to hold said cushion in position relative to said frame with said second side portion proximate said first knife while permitting the remainder of said first side portion to expand laterally during a shearing operation.

3. A shearing machine for shearing a workpiece from a member with relatively low power and without attendant curling of said workpiece comprising a frame, a first stationary knife mounted on said frame, a second knife, means mounting said second knife for movement toward and away from said first knife, said second knife having a relatively high rake angle which would normally cause curling of said workpiece but which permits relatively low power to be utilized in effecting said shearing, and workpiece support means adjacent said first knife and located in opposition to said second knife, said workpiece support means comprising a resilient block-like workpiece cushion, means for mounting said cushion on said frame, a work support cap having a portion overlying said cushion to engage said workpiece and therefore prevent said workpiece from abrading said cushion, means for guiding said cushion for movement in a vertical direction while permitting said cushion to expand laterally during the shearing operation, said means for mounting said cushion on said frame comprising a housing, an opening in said housing for selectively inserting and removing said cushion, said housing including a bottom plate for supporting said cushion, and wherein said means for guiding said cushion in a vertical direction while permitting said cushion to expand includes spaced means for engaging the side of said cushion.

4. A shearing machine as set forth in claim 3 wherein said housing includes a vertical wall and wherein said spaced means are mounted on said vertical wall, a second vertical wall on said housing, and means extending through said second wall for securing said second wall to said frame.

5. A shearing machine as set forth in claim 3 wherein said spaced means for engaging the side of said cushion comprise adjustment screws.

6. A shearing machine as set forth in claim 2 wherein said work support cap includes downwardly depending leg means which extend across said second side portion, said means operatively associated with said housing holding said leg means in abutting engagement with said first knife to prevent foreign matter from entering therebetween.

References Cited

UNITED STATES PATENTS

| 294,966 | 3/1884 | Chess | 83—157 |
| 1,000,789 | 8/1911 | Elliott et al. | 83—157 X |
| 2,742,087 | 4/1956 | Smith et al. | 83—157 X |

FOREIGN PATENTS

| 788,330 | 12/1957 | Great Britain. | |

ANDREW R. JUHASZ, *Primary Examiner.*